US011102661B2

(12) United States Patent
Zhang et al.

(10) Patent No.: US 11,102,661 B2
(45) Date of Patent: Aug. 24, 2021

(54) BEAM INDICATION INFORMATION TRANSMISSION

(71) Applicant: Apple Inc., Cupertino, CA (US)

(72) Inventors: Yushu Zhang, Beijing (CN); Alexei Davydov, Nizhny Novgorod (RU); Debdeep Chatterjee, San Jose, CA (US); Gang Xiong, Portland, OR (US); Guotong Wang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/408,319

(22) Filed: May 9, 2019

(65) Prior Publication Data

US 2020/0137588 A1 Apr. 30, 2020

Related U.S. Application Data

(63) Continuation of application No. 16/352,255, filed on Mar. 13, 2019, now abandoned.
(Continued)

(51) Int. Cl.
*H04W 16/28* (2009.01)
*H04W 72/04* (2009.01)
(Continued)

(52) U.S. Cl.
CPC ............. *H04W 16/28* (2013.01); *H04L 5/001* (2013.01); *H04W 72/042* (2013.01);
(Continued)

(58) Field of Classification Search
CPC . H04W 16/28; H04W 72/042; H04W 72/046; H04L 5/001; H04L 1/1607;
(Continued)

(56) References Cited

U.S. PATENT DOCUMENTS 10,651,917 B2 * 5/2020 John Wilson ......... H04L 5/0073
10,687,352 B2 * 6/2020 John Wilson ..... H04W 72/1289
(Continued)

FOREIGN PATENT DOCUMENTS

WO 2019210193 A1 10/2019
WO 2020018265 A1 1/2020

OTHER PUBLICATIONS

U.S. Appl. No. 16/352,255, Non-Final Office Action, dated Jul. 28, 2020, 16 pages.

*Primary Examiner* — Brian T O Connor

(57) ABSTRACT

Technology for user equipment (UE) operable to decode beam indication related information received from a New Radio (NR) base station in a physical downlink shared channel (PDSCH) is disclosed. The UE can decode a transmission configuration indication (TCI) received in a downlink control information (DCI) from the NR base station on a scheduling physical downlink control channel (PDCCH) in a scheduled bandwidth part (BWP) or a scheduled component carrier (CC). The UE can decode a scheduling offset received from the NR base station, wherein the scheduling offset is an offset time for reception of beam indication related information in a physical downlink shared channel (PDSCH). The UE can decode the beam indication related information received from the NR base station in the PDSCH on the scheduled BWP or the scheduled CC at a time period greater than or equal to the scheduling offset relative to the PDCCH transmission.

20 Claims, 12 Drawing Sheets

Related U.S. Application Data

(60) Provisional application No. 62/645,043, filed on Mar. 19, 2018.

(51) Int. Cl.
*H04L 5/00* (2006.01)
*H04B 7/06* (2006.01)
*H04L 1/16* (2006.01)

(52) U.S. Cl.
CPC ......... *H04W 72/046* (2013.01); *H04B 7/0695* (2013.01); *H04L 1/1607* (2013.01)

(58) Field of Classification Search
CPC ... H04L 5/0064; H04L 5/0048; H04L 5/0023; H04L 5/0053; H04L 5/0091; H04B 7/0695
See application file for complete search history.

(56) References Cited

U.S. PATENT DOCUMENTS

| | | | |
|---|---|---|---|
| 10,979,273 B2* | 4/2021 | Wilson | H04W 64/003 |
| 2019/0222289 A1* | 7/2019 | John Wilson | H04B 7/0695 |
| 2019/0229792 A1* | 7/2019 | John Wilson | H04B 7/0626 |
| 2019/0230545 A1* | 7/2019 | Liou | H04W 24/10 |
| 2019/0254120 A1* | 8/2019 | Zhang | H04W 4/80 |
| 2019/0261244 A1* | 8/2019 | Jung | H04W 36/305 |
| 2019/0296876 A1* | 9/2019 | Zhang | H04L 5/0023 |
| 2020/0127799 A1* | 4/2020 | Orsino | H04L 5/0007 |
| 2020/0128546 A1* | 4/2020 | Shi | H04L 5/0053 |
| 2020/0221435 A1* | 7/2020 | Kim | H04L 5/0048 |

* cited by examiner

BEAM INDICATION INFORMATION TRANSMISSION

RELATED APPLICATIONS

The present application is a continuation of U.S. patent application Ser. No. 16/352,255 filed Mar. 13, 2019 which claims the benefit of U.S. Provisional Patent Application No. 62/645,043, filed Mar. 19, 2018, the entire specification of which is hereby incorporated by reference in its entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
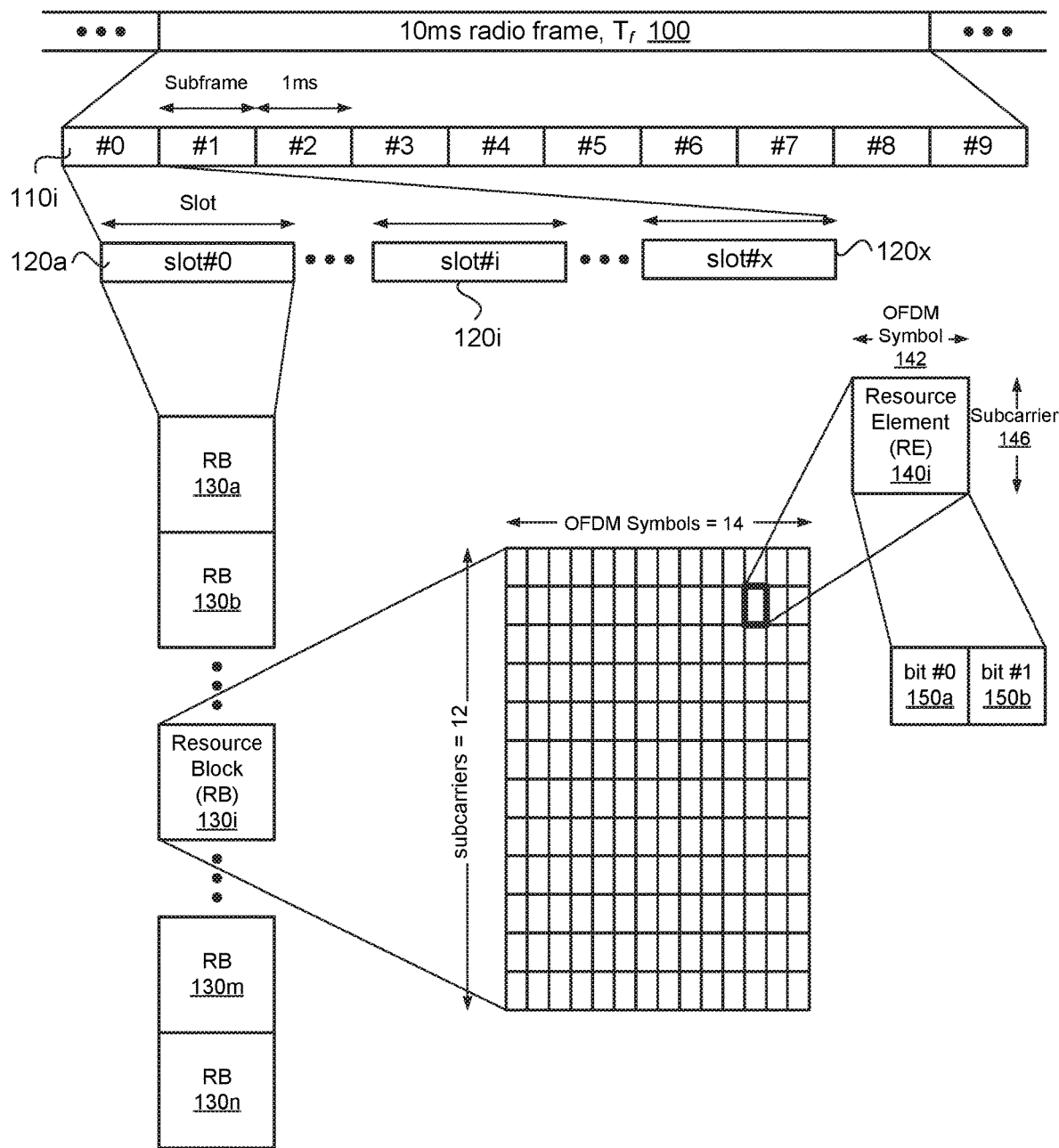
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into one or multiple slots 120a, 120i, and 120x, each with a duration, $T_{slot}$, of 1/μms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140i can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one configuration, in a 5G system, a base station (or gNB) and a UE can both maintain a plurality of beams. The UE can use one particular receiving (Rx) beam to receive one gNB transmitting (Tx) beam in order to obtain a favorable link budget. Then, beam indication related information on the gNB Tx beam can be used for the UE to select its Rx beam. In previous solutions, such beam indication related information for a physical downlink shared channel (PDSCH) can be carried by downlink control information (DCI).

As described in further detail below, a UE can receive beam indication related information from a NR base station in a physical downlink shared channel (PDSCH). The UE can receive a transmission configuration indication (TCI) in a downlink control information (DCI) from the NR base station on a scheduling physical downlink control channel (PDCCH) in a scheduled bandwidth part (BWP) or a scheduled component carrier (CC). Cross-carrier scheduling for the scheduled BPW or the scheduled CC can be used for the UE in a NR network. The UE can receive a scheduling offset from the NR base station. The scheduling offset can be an offset time for reception of beam indication related information in a physical downlink shared channel (PDSCH). The UE can receive the beam indication related information from the NR base station in the PDSCH on the scheduled BWP or the scheduled CC at a time period greater than or equal to the scheduling offset relative to the PDCCH transmission. The UE can determine a quasi-co location (QCL) for reception of the beam indication related information in the PDSCH based on the TCI, when the time period is greater than or equal to the scheduling offset relative for the PDCCH transmission.

Figure 2:
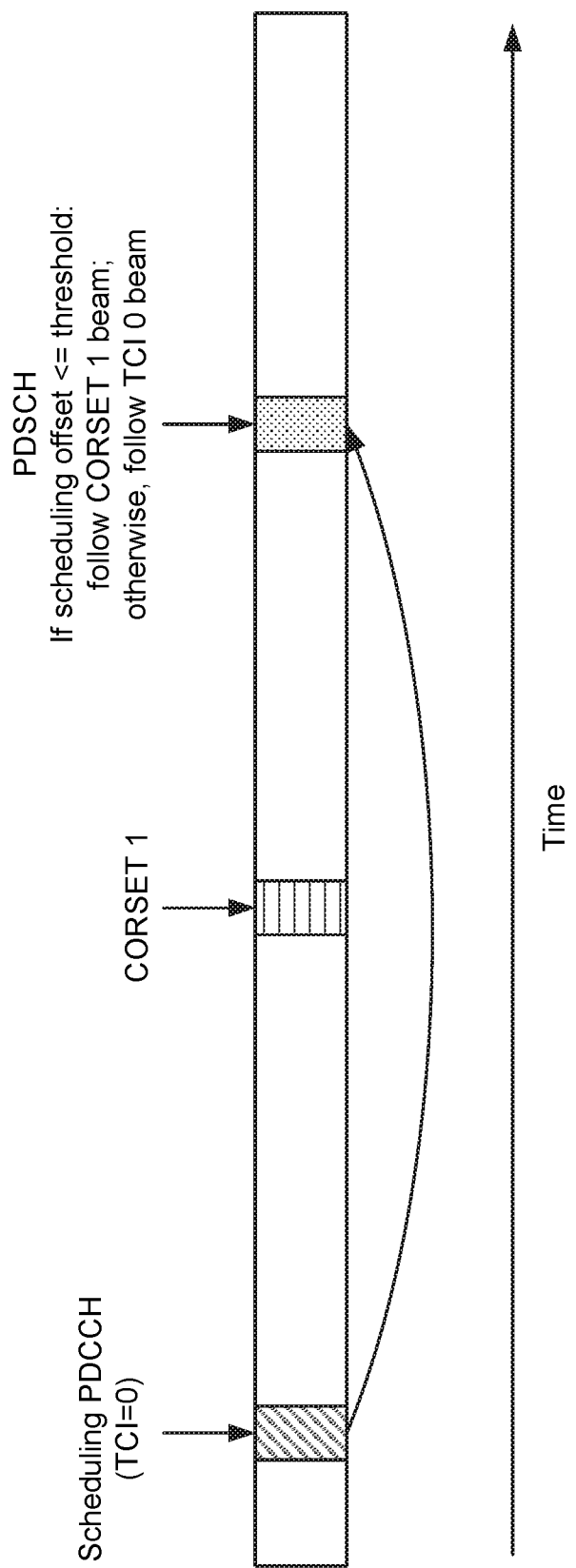
FIG. 2 illustrates a beam indication framework when a transmission configuration indication (TCI) is present in accordance with an example.

FIG. 2 illustrates an example of a beam indication framework when a transmission configuration indication (TCI) is present. When a scheduling offset is below a threshold, a PDSCH beam can follow a latest control resource set (CORESET) beam (e.g., CORESET 1). Otherwise, when a TCI (which is used for beam indication) is present (e.g., TCI=0) in a scheduling physical downlink control channel (PDCCH), the PDSCH beam can follow the indicated TCI (e.g., the TCI 0 beam can be followed).

Figure 3:
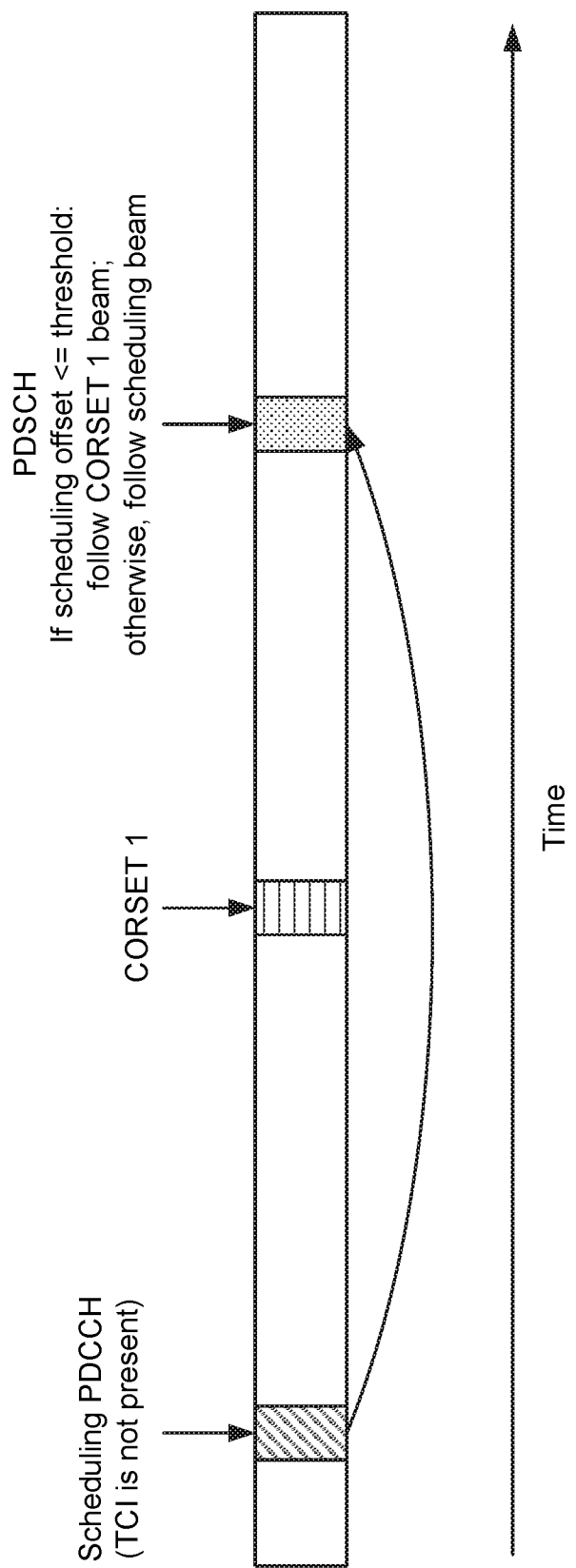
FIG. 3 illustrates a beam indication framework when a transmission configuration indication (TCI) is not present in accordance with an example.

FIG. 3 illustrates an example of a beam indication framework when a transmission configuration indication (TCI) is not present. When a scheduling offset is below a threshold, a PDSCH beam can follow a latest control resource set (CORESET) beam (e.g., CORESET 1). Otherwise, when a TCI (which is used for beam indication) is not present in a scheduling physical downlink control channel (PDCCH), the PDSCH beam can be the same as the scheduling PDCCH. In other words, when the TCI is not present and the scheduling offset is not below the threshold, the scheduling PDCCH beam can be followed.

In one example, when a cross Component Carrier (CC) or cross bandwidth part (BWP) is used, the determination of the beam of the PDSCH can be an issue.

In the present technology, techniques are defined for PDSCH beam indication when multiple CC/BWPs are configured. For example, a PDSCH beam indication is defined for when a scheduling offset is less than a threshold. In another example, a PDSCH beam indication when a TCI is not present and a scheduling offset is greater than a threshold. In yet another example, a PDSCH beam indication is defined when a TCI is present and a scheduling offset is greater than a threshold.

In one configuration, with respect to a default PDSCH beam assumption, when a scheduling offset is below a threshold, a UE cannot decode information from the PDCCH and determine PDSCH beam indication information. Thus, rules for the UE assumption of its default PDSCH beam assumption are defined below.

In one example, when a UE is configured with multiple BWPs/CCs and a scheduling offset is below the threshold, the PDSCH can be spatially Quasi-Co-Located (QCLed) with one TCI state, which can be configured by higher layer signaling or can be fixed. In another example, when a UE is configured with multiple BWPs/CCs and the scheduling offset is below a threshold, the PDSCH can be spatially QCLed with a lowest CORESET ID in a latest slot in a current (or a target) BWP/CC with a PDSCH transmission. Alternatively, the PDSCH can be spatially QCLed with a latest CORESET ID across some or all of the configured BWPs/CCs.

In one example, if cross BWP/CC scheduling is used and the scheduling offset is below the threshold, the PDSCH can be spatially QCLed with the CORESET scheduling the PDSCH transmission.

Figure 4:
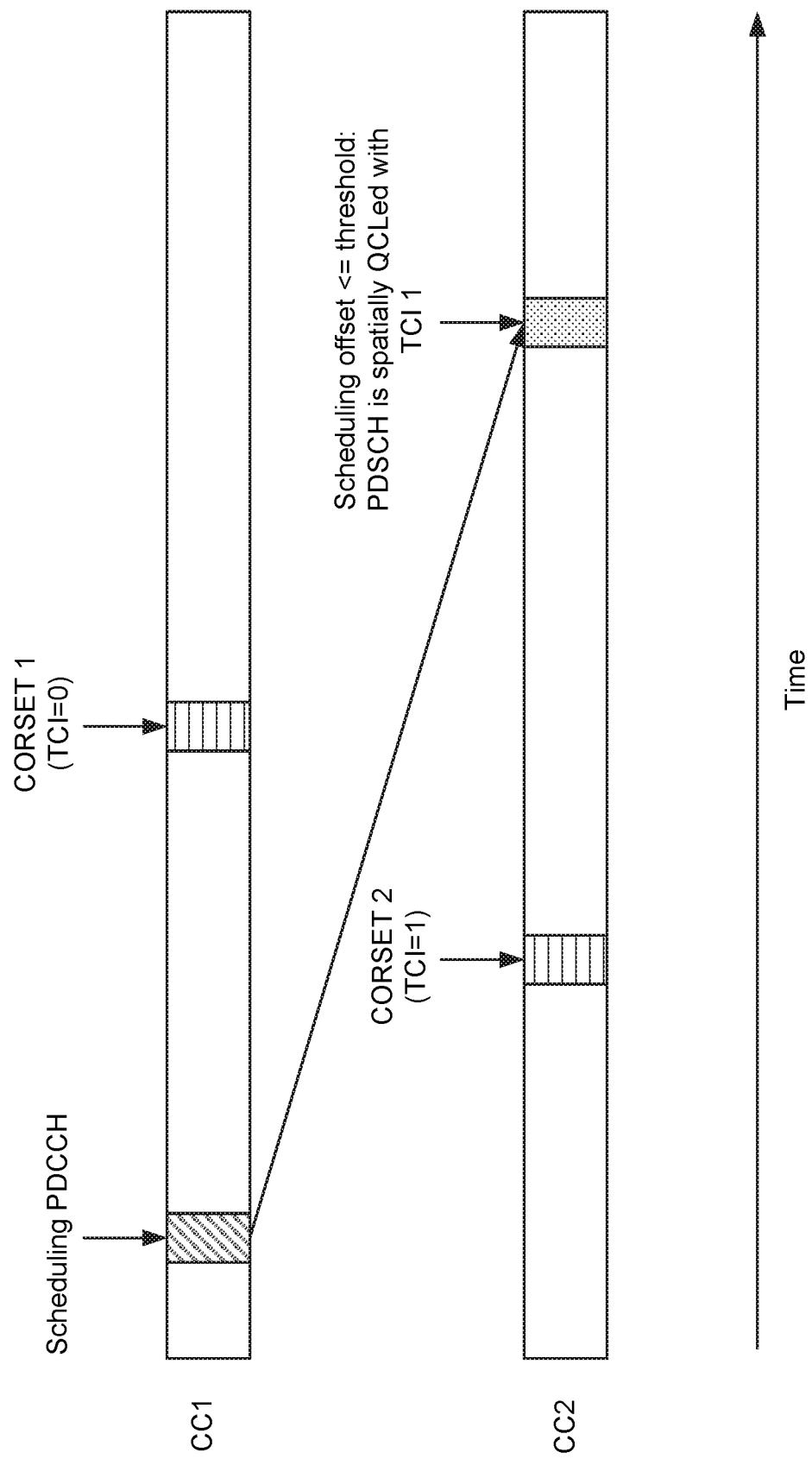
FIG. 4 illustrates a default physical downlink shared channel (PDSCH) beam assumption in accordance with an example.

FIG. 4 illustrates an exemplary default physical downlink shared channel (PDSCH) beam assumption. For example, when a UE is configured with multiple BWPs/CCs and the scheduling offset is below a threshold, the PDSCH can be spatially QCLed with a lowest CORESET ID in a latest slot in a current (or a target) BWP/CC with a PDSCH transmission. As shown in FIG. 4, a first CC (CC1) can be associated with the scheduling PDCCH and a first CORESET (CORSET 1, where TCI=0), and a second CC (CC2) can be associated with a second CORESET (CORSET 2), where TCI=1). In this example, when the scheduling offset is less than the threshold, the PDSCH can be spatially QCLed with TCI 1.

In one configuration, since a UE can assume the PDSCH is spatially QCLed with one CORESET, the UE can expect that at least one CORESET in a CC/BWP is configured and the UE can have at least one monitoring occasion of this CORESET before the PDSCH transmission.

Alternatively, if there is no CORESET configured or the monitoring occasion of the CORESET is after the PDSCH transmission in the CC/BWP with the PDSCH transmission, the UE can expect that the TCI is present in the scheduling PDCCH with a scheduling delay longer than a specified threshold, or that the PDSCH can be spatially QCLed with one TCI state which is predefined, e.g., a first TCI state, or configured by higher layer signaling. For these two options, if the scheduling delay is less than the specified threshold, the UE can assume that the PDSCH is spatially QCLed with one TCI state that is either pre-defined or configured by higher layers.

In one configuration, with respect to a PDSCH beam indication when a scheduling offset is above a threshold, the PDSCH beam can be spatially QCLed with either an indicated TCI state (when TCI is present) or the scheduling PDCCH (when TCI is not present) when the scheduling offset is above the threshold.

In one example, if cross BWP/CC scheduling is used, when TCI is not present, the PDSCH can be spatially QCLed with one TCI state, which can be configured by higher layer signaling or can be fixed. In one example, the PDSCH can be spatially QCLed with a first TCI state configured by a media access control (MAC) control element (CE) or via radio resource control (RRC) signaling.

Alternatively, the PDSCH can be spatially QCLed with a lowest CORESET ID in a latest slot in a current (target) BWP/CC with a PDSCH transmission, or across some or all configured BWPs/CCs. In this case, the UE can be scheduled with a cross-BWP PDSCH with a scheduling delay, such that there is at least one monitoring occasion for the PDCCH in a CORESET in the current (target) BWP carrying the PDSCH before a start of the PDSCH. In addition, whether the UE is to follow the PDCCH beam when TCI is not present and the scheduling offset is above a threshold can be configured by higher layer signaling, or determined by whether a BWP/CC index is indicated in DCI or by a value of BWP/CC index.

Figure 5:
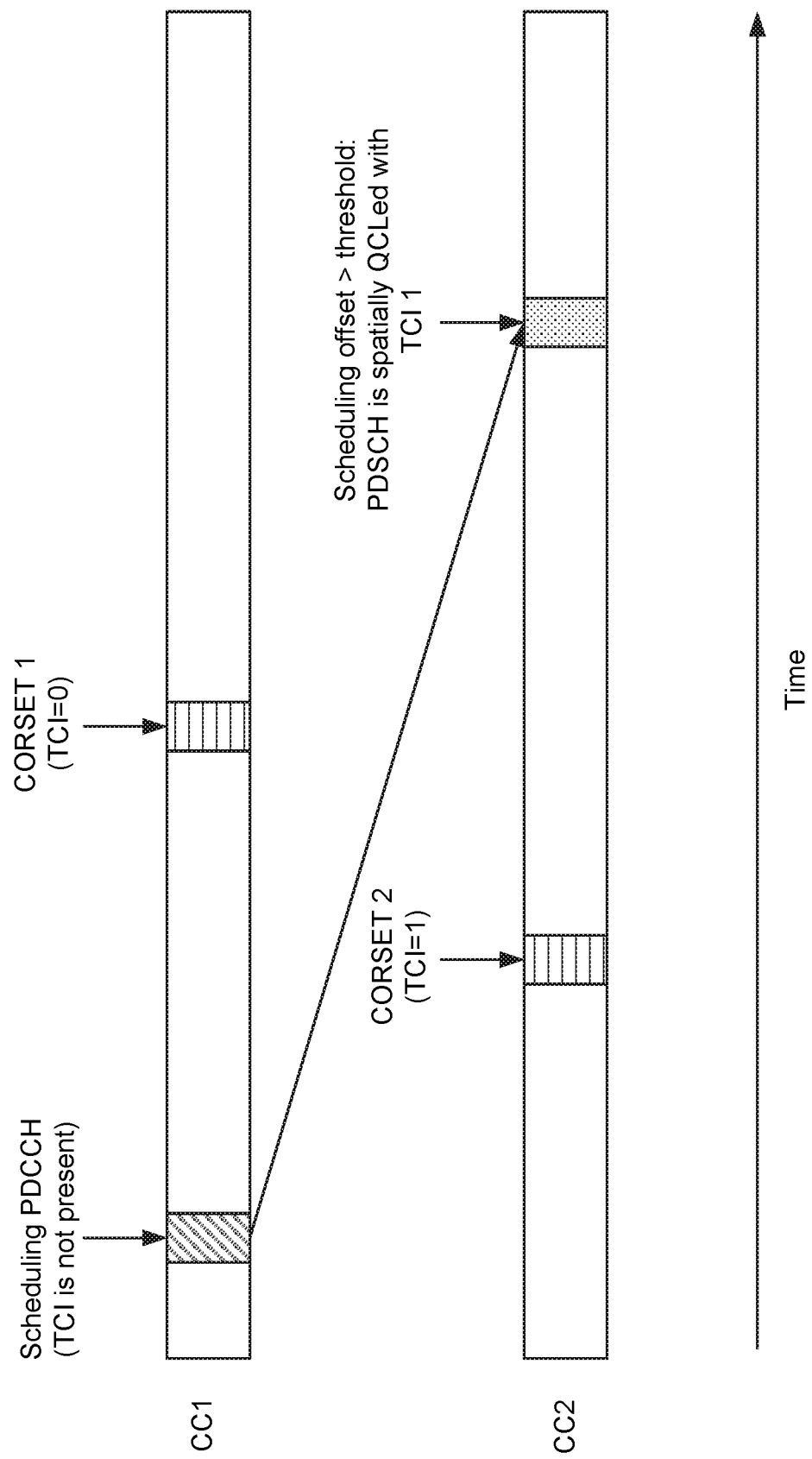
FIG. 5 illustrates a physical downlink shared channel (PDSCH) beam indication without a transmission configuration indication (TCI) in accordance with an example.

FIG. 5 illustrates an exemplary physical downlink shared channel (PDSCH) beam indication without a transmission configuration indication (TCI). For example, the PDSCH can be spatially QCLed with a lowest CORESET ID in a latest slot in a current (target) BWP/CC with a PDSCH transmission. As shown in FIG. 5, a first CC (CC1) can be associated with the scheduling PDCCH (TCI is not present) and a first CORESET (CORSET 1, where TCI=0), and a second CC (CC2) can be associated with a second CORESET (CORSET 2), where TCI=1). In this example, when the scheduling offset is greater than a threshold, the PDSCH can be spatially QCLed with TCI 1.

In one example, if cross BWP/CC scheduling is used, when TCI is present, the PDSCH can be spatially QCLed with an indicated TCI, where the TCI can be based on configured TCI states for the BWP/CC with a PDSCH transmission or across configured BWPs/CCs.

In one example, a base station (e.g., gNB) can configure N TCI states for each BWPs/CCs, and then an indicated TCI can be selected from configured TCI states for the BWP/CC with a PDSCH transmission, wherein N is a positive integer.

In one example, the CORESET for beam indication can indicate the UE's monitoring CORESETs. The CORESETs can indicate the CORESET for unicast PDSCH or broadcast PDSCH or both transmissions. In addition, a threshold for cross BWP/CC scheduling can be different from a threshold for intra BWP/CC scheduling, which can be reported based on a UE capability.

In one configuration, a UE can determine spatially Quasi-Co-Locate (QCL) for a PDSCH. When the UE is configured with multiple BWPs/CCs and a scheduling offset is below a threshold, the PDSCH can be spatially Quasi-Co-Located (QCLed) with one TCI state. The TCI state can be configured by higher layer signaling or can be fixed. In another example, when a UE is configured with multiple BWPs/CCs and a scheduling offset is below the threshold, the PDSCH can be spatially QCLed with a latest CORESET with a lowest CORESET ID in a current BWP/CC with a PDSCH transmission. In yet another example, when a UE is configured with multiple BWPs/CCs and a scheduling offset is below the threshold, the PDSCH can be spatially QCLed with a latest CORESET with a lowest CORESET ID across some or all the configured BWPs/CCs.

In one example, if cross BWP/CC scheduling is used, when a TCI is not present, the PDSCH can be spatially QCLed with one TCI state, which can be configured by higher layer signaling or can be fixed. In another example, if cross BWP/CC scheduling is used, when a TCI is not present, the PDSCH can be spatially QCLed with a latest CORESET with a lowest CORESET ID in a current BWP/CC with a PDSCH transmission or across some or all the configured BWPs/CCs.

In one example, whether the UE is to follow a PDCCH beam when a TCI is not present and a scheduling offset is above a threshold can be configured by higher layer signaling, or can be determined by whether a BWP/CC index is indicated in DCI or by a value of BWP/CC index. In another example, if cross BWP/CC scheduling is used, when TCI is present, a PDSCH can be spatially QCLed with an indicated TCI, where the TCI can be based on configured TCI states for a BWP/CC with a PDSCH transmission or across configured BWPs/CCs.

In one example, the CORESET for beam indication can indicate the UE's monitoring CORESETs. In another example, a threshold for cross BWP/CC scheduling can be different from a threshold for intra BWP/CC scheduling, which can be reported based on a UE capability.

Figure 6:
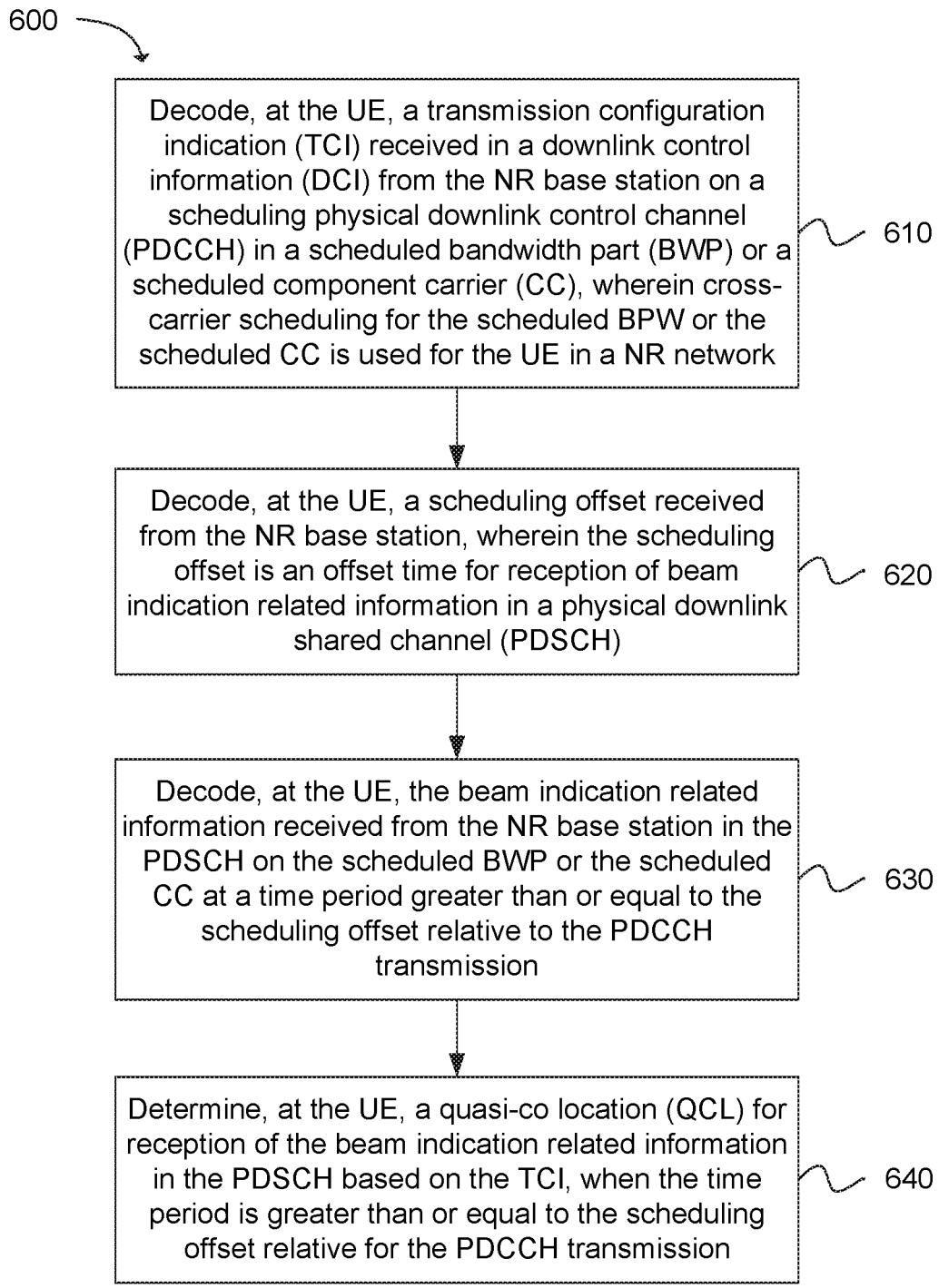
FIG. 6 depicts functionality of a user equipment (UE) operable to decode beam indication related information received from a New Radio (NR) base station in a physical downlink shared channel (PDSCH) in accordance with an example.

Another example provides functionality 600 of a user equipment (UE) operable to decode beam indication related information received from a New Radio (NR) base station in a physical downlink shared channel (PDSCH), as shown in FIG. 6. The UE can comprise one or more processors configured to decode, at the UE, a transmission configuration indication (TCI) received in a downlink control information (DCI) from the NR base station on a scheduling physical downlink control channel (PDCCH) in a scheduled bandwidth part (BWP) or a scheduled component carrier (CC), wherein cross-carrier scheduling for the scheduled BPW or the scheduled CC is used for the UE in a NR network, as in block 610. The UE can comprise one or more processors configured to decode, at the UE, a scheduling offset received from the NR base station, wherein the scheduling offset is an offset time for reception of beam indication related information in a physical downlink shared channel (PDSCH), as in block 620. The UE can comprise one or more processors configured to decode, at the UE, the beam indication related information received from the NR base station in the PDSCH on the scheduled BWP or the scheduled CC at a time period greater than or equal to the scheduling offset relative to the PDCCH transmission, as in block 630. The UE can comprise one or more processors configured to determine, at the UE, a quasi-co location (QCL) for reception of the beam indication related information in the PDSCH based on the TCI, when the time period is greater than or equal to the scheduling offset relative for the PDCCH transmission, as in block 640. In addition, the UE can comprise a memory interface configured to send to a memory the TCI, the scheduling offset and the beam indication related information.

Figure 7:
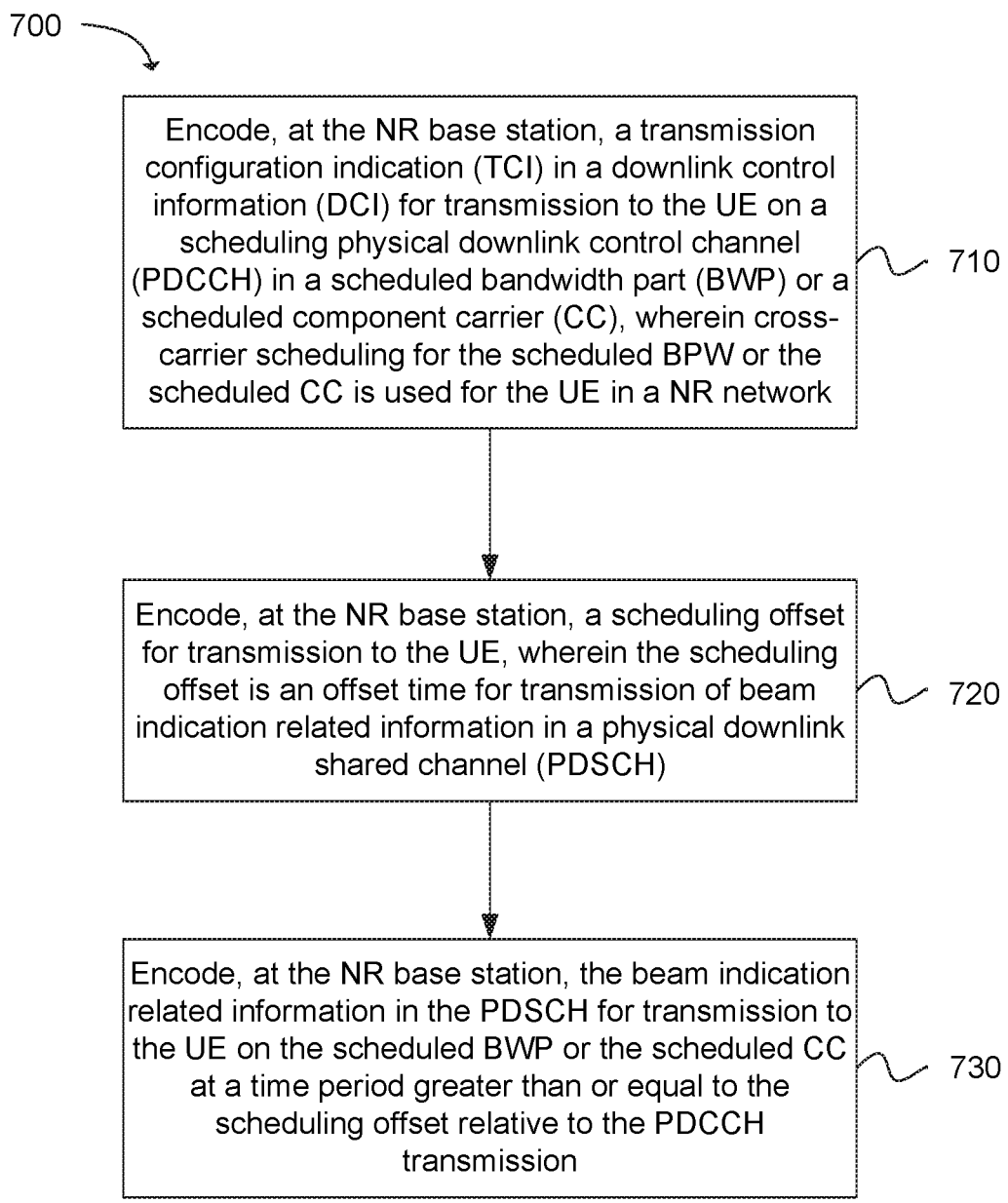
FIG. 7 depicts functionality of a New Radio (NR) base station operable to encode beam indication related information for transmission in a physical downlink shared channel (PDSCH) to a user equipment (UE) in accordance with an example.

Another example provides functionality 700 of a New Radio (NR) base station operable to encode beam indication related information for transmission in a physical downlink shared channel (PDSCH) to a user equipment (UE), as shown in FIG. 7. The NR base station can comprise one or more processors configured to encode, at the NR base station, a transmission configuration indication (TCI) in a downlink control information (DCI) for transmission to the UE on a scheduling physical downlink control channel (PDCCH) in a scheduled bandwidth part (BWP) or a scheduled component carrier (CC), wherein cross-carrier scheduling for the scheduled BPW or the scheduled CC is used for the UE in a NR network, as in block 710. The NR base station can comprise one or more processors configured to encode, at the NR base station, a scheduling offset for transmission to the UE, wherein the scheduling offset is an offset time for transmission of beam indication related information in a physical downlink shared channel (PDSCH), as in block 720. The NR base station can comprise one or more processors configured to encode, at the NR base station, the beam indication related information in the PDSCH for transmission to the UE on the scheduled BWP or the scheduled CC at a time period greater than or equal to the scheduling offset relative to the PDCCH transmission, wherein the TCI enables the UE to determine a quasi-co location (QCL) for reception of the beam indication related information in the PDSCH when the time period is greater than or equal to the scheduling offset relative for the PDCCH transmission, as in block 730. In addition, the NR base station can comprise a memory interface configured to retrieve from a memory the TCI, the scheduling offset and the beam indication related information.

Figure 8:
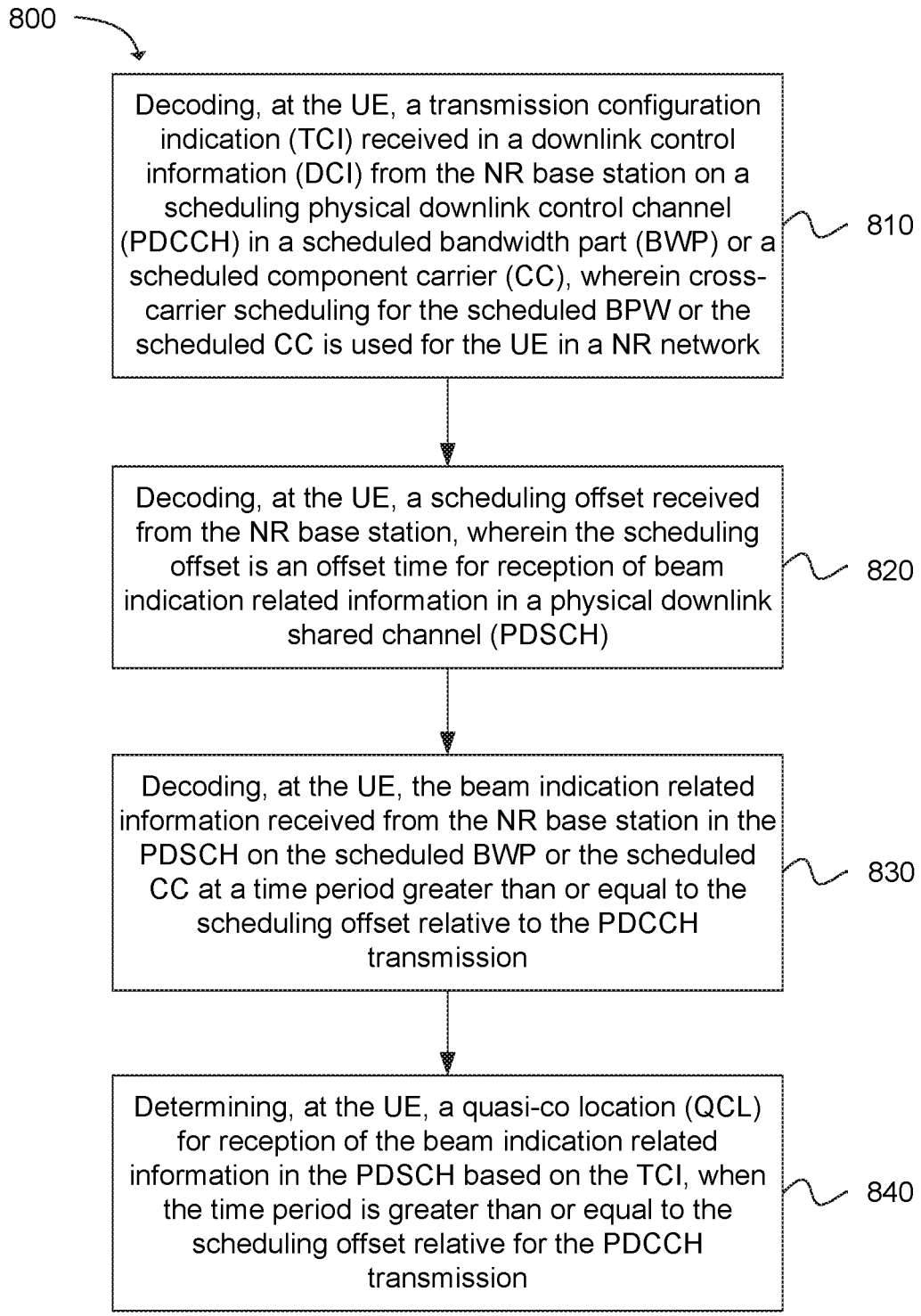
FIG. 8 depicts a flowchart of a machine readable storage medium having instructions embodied thereon for encoding beam indication related information for transmission in a physical downlink shared channel (PDSCH) from a New Radio (NR) base station to a user equipment (UE) in accordance with an example.

Another example provides at least one machine readable storage medium having instructions 800 embodied thereon for encoding beam indication related information for transmission in a physical downlink shared channel (PDSCH) from a New Radio (NR) base station to a user equipment (UE), as shown in FIG. 8. The instructions can be executed on a machine, where the instructions are included on at least one computer readable medium or one non-transitory machine readable storage medium. The instructions when executed by one or more processors of the UE perform: decoding, at the UE, a transmission configuration indication (TCI) received in a downlink control information (DCI) from the NR base station on a scheduling physical downlink control channel (PDCCH) in a scheduled bandwidth part (BWP) or a scheduled component carrier (CC), wherein cross-carrier scheduling for the scheduled BPW or the scheduled CC is used for the UE in a NR network, as in block 810. The instructions when executed by one or more processors of the UE perform: decoding, at the UE, a scheduling offset received from the NR base station, wherein the scheduling offset is an offset time for reception of beam indication related information in a physical downlink shared channel (PDSCH), as in block 820. The instructions when executed by one or more processors of the UE perform: decoding, at the UE, the beam indication related information received from the NR base station in the PDSCH on the scheduled BWP or the scheduled CC at a time period greater than or equal to the scheduling offset relative to the PDCCH transmission, as in block 830. The instructions when executed by one or more processors of the UE perform: determining, at the UE, a quasi-co location (QCL) for reception of the beam indication related information in the PDSCH based on the TCI, when the time period is greater than or equal to the scheduling offset relative for the PDCCH transmission, as in block 840.

Figure 9:
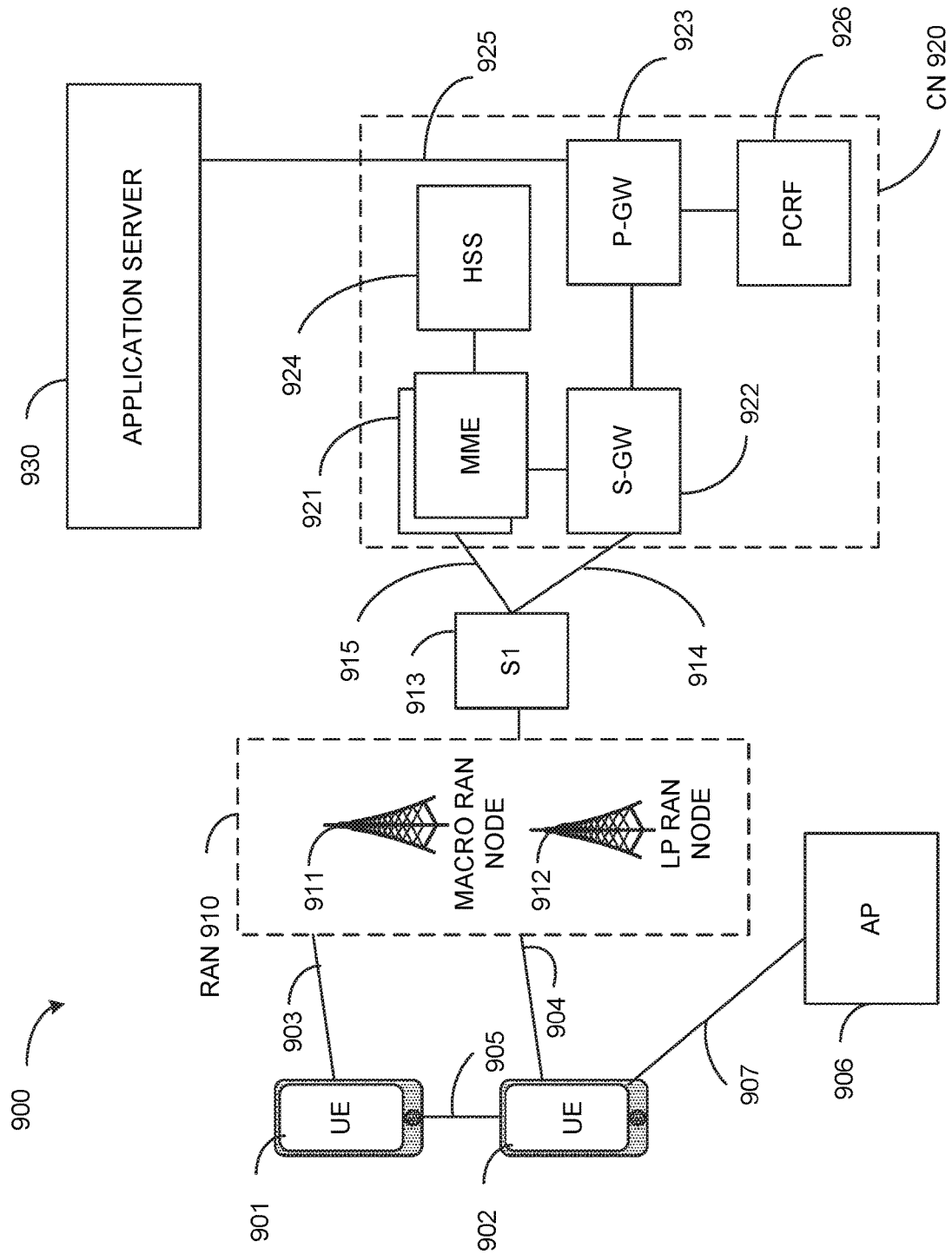
FIG. 9 illustrates an architecture of a wireless network in accordance with an example.

FIG. 9 illustrates an architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.11 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 901 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
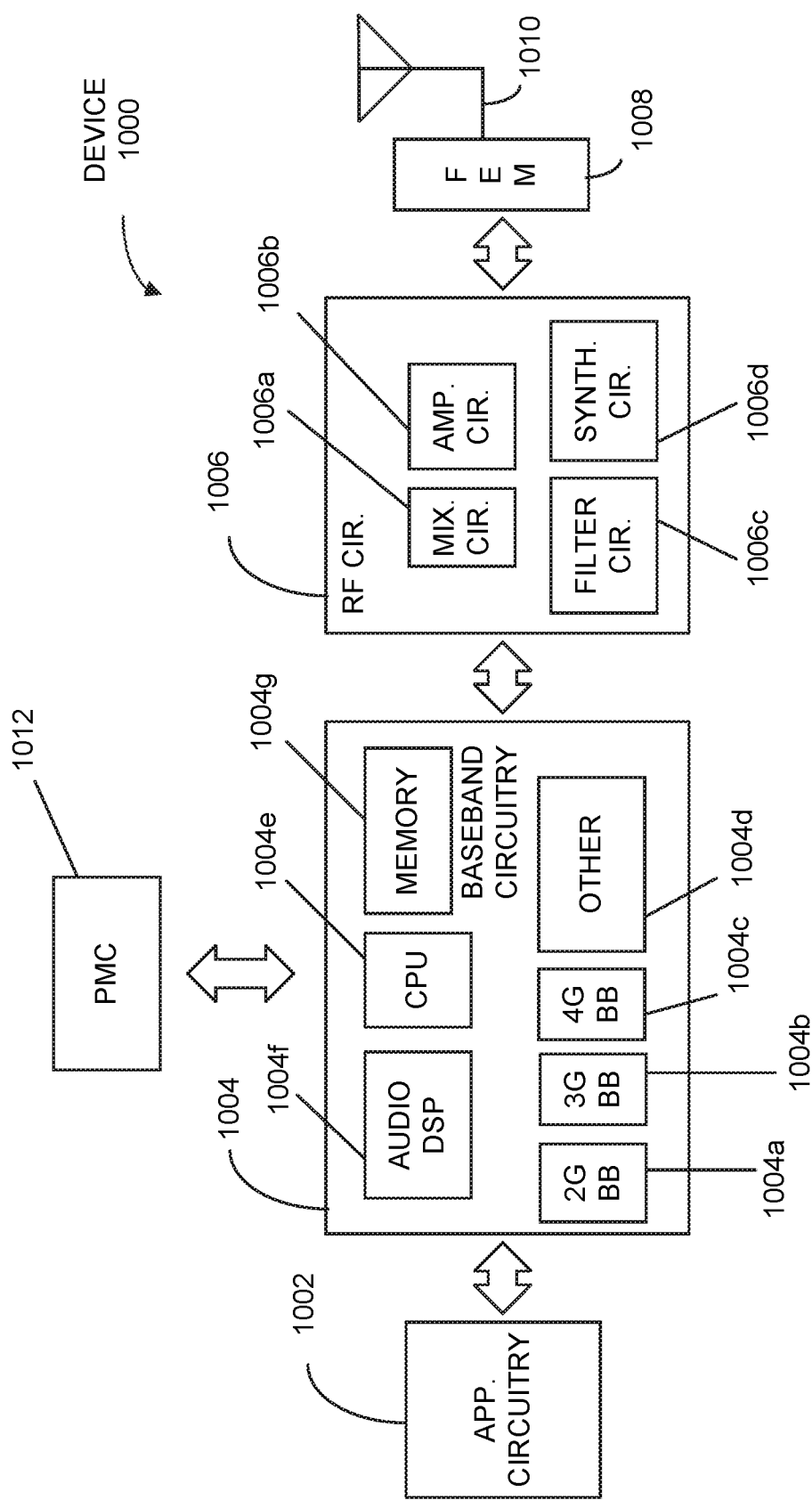
FIG. 10 illustrates a diagram of a wireless device (e.g., UE) in accordance with an example.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004a, a fourth generation (4G) baseband processor 1004b, a fifth generation (5G) baseband processor 1004c, or other baseband processor(s) 1004d for other existing generations, generations in development or to be developed in the future (e.g., second generation (2G), sixth generation (6G), etc.). The baseband circuitry 1004 (e.g., one or more of baseband processors 1004a-d) may handle various radio control functions that enable communication with one or more radio networks via the RF circuitry 1006. In other embodiments, some or all of the functionality of baseband processors 1004a-d may be included in modules stored in the memory 1004g and executed via a Central Processing Unit (CPU) 1004e. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO). Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 10 12 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it can transition back to RRC_Connected state.

An additional power saving mode may allow a device to be unavailable to the network for periods longer than a paging interval (ranging from seconds to a few hours). During this time, the device can be unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
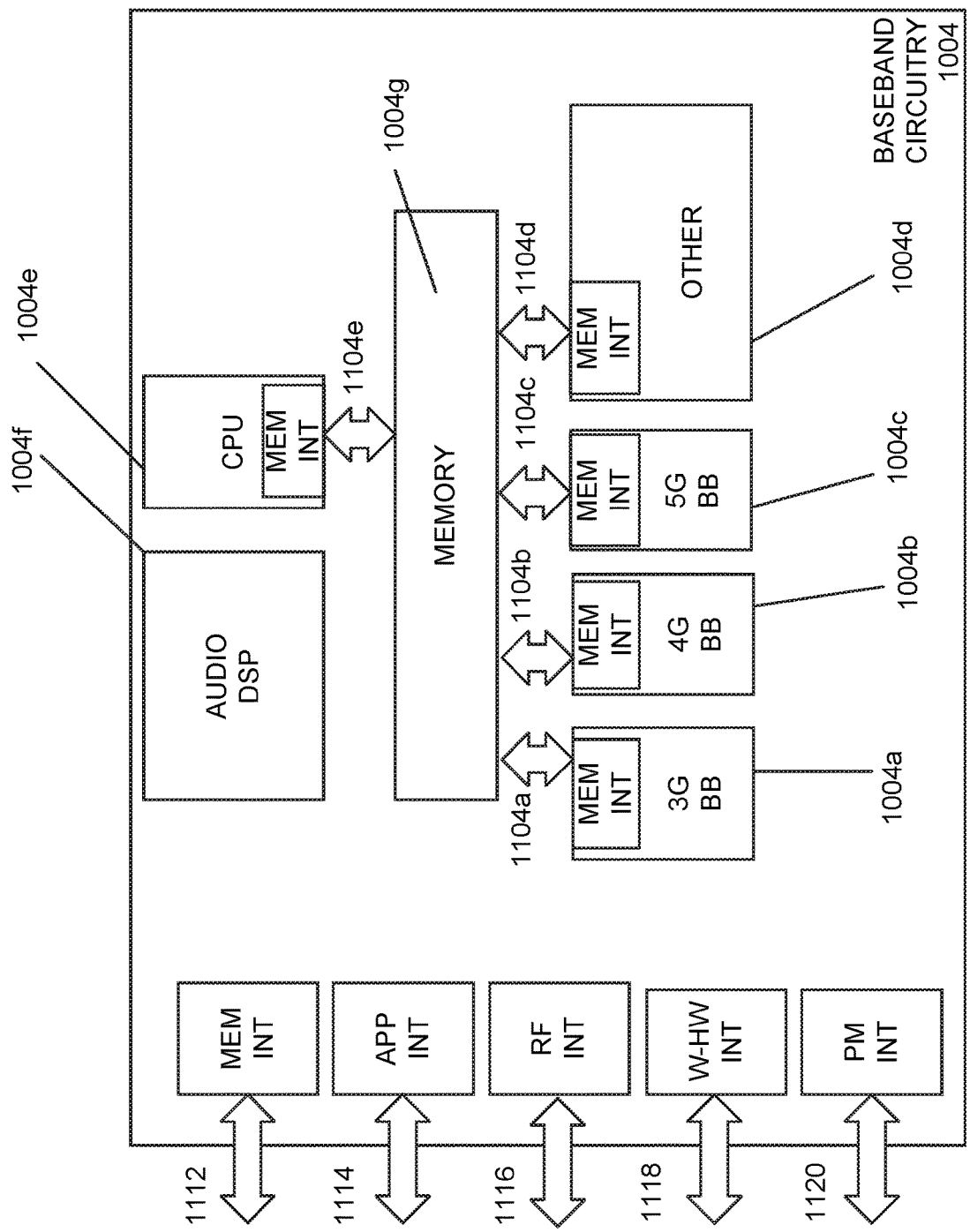
FIG. 11 illustrates interfaces of baseband circuitry in accordance with an example.

FIG. 11 illustrates example interfaces of baseband circuitry in accordance with some embodiments. As discussed above, the baseband circuitry 1004 of FIG. 10 may comprise processors 1004*a*-1004*e* and a memory 1004*g* utilized by said processors. Each of the processors 1004*a*-1004*e* may include a memory interface, 1104*a*-1104*e*, respectively, to send/receive data to/from the memory 1004*g*.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

Figure 12:
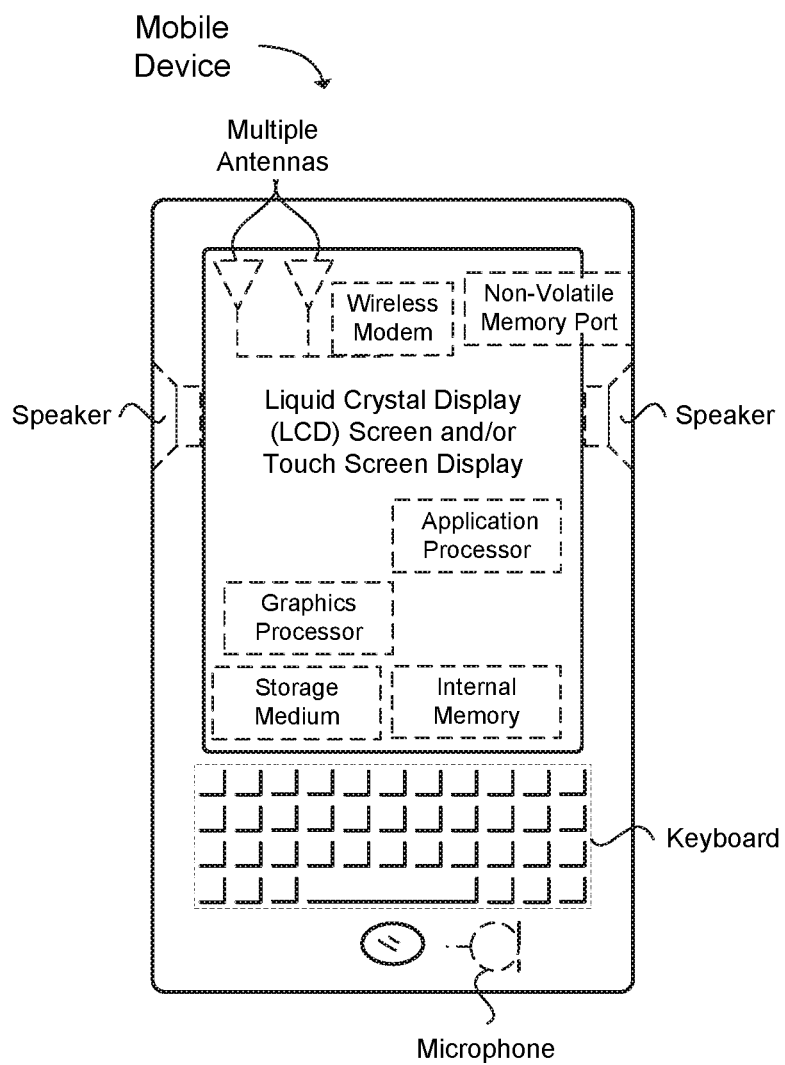
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of a user equipment (UE) operable to decode beam indication related information received from a New Radio (NR) base station in a physical downlink shared channel (PDSCH), the apparatus comprising: decode, at the UE, a transmission configuration indication (TCI) received in a downlink control information (DCI) from the NR base station on a scheduling physical downlink control channel (PDCCH) in a scheduled bandwidth part (BWP) or a scheduled component carrier (CC), wherein cross-carrier scheduling for the scheduled BPW or the scheduled CC is used for the UE in a NR network; decode, at the UE, a scheduling offset received from the NR base station, wherein the scheduling offset is an offset time for reception of beam indication related information in a physical downlink shared channel (PDSCH); decode, at the UE, the beam indication related information received from the NR base station in the PDSCH on the scheduled BWP or the scheduled CC at a time period greater than or equal to the scheduling offset relative to the PDCCH transmission; and determine, at the UE, a quasi-co location (QCL) for reception of the beam indication related information in the PDSCH based on the TCI, when the time period is greater than or equal to the scheduling offset relative for the PDCCH transmission, and a memory interface configured to send to a memory the TCI, the scheduling offset and the beam indication related information.

Example 2 includes the apparatus of Example 1, further comprising a transceiver configured to: receive the TCI from the NR base station; receive the scheduling offset from the NR base station; and receive the beam indication related information from the NR base station.

Example 3 includes the apparatus of any of Examples 1 to 2, wherein the PDSCH is spatially QCLed with a corresponding downlink reference signal in the TCI when the TCI is included in the scheduling PDCCH and the scheduling offset is greater than or equal to a defined threshold.

Example 4 includes the apparatus of any of Examples 1 to 3, wherein N TCI states are configured for the scheduled BWP or the scheduled CC, wherein N is a positive integer, and the TCI is selected from the N TCI states for the scheduled BWP or the scheduled CC.

Example 5 includes the apparatus of any of Examples 1 to 4, wherein the TCI is included in the scheduling PDCCH when no control resource set (CORESET) is configured or a monitoring occasion of the CORESET is after a data transmission in the PDSCH in the scheduled BWP or the scheduled CC with the PDSCH transmission, and the TCI is included in the scheduling PDCCH with a scheduling delay that is greater than or equal to a defined threshold.

Example 6 includes the apparatus of any of Examples 1 to 5, wherein the CORESET indicates monitoring CORESETs for the UE, and the CORSET is for one or more of a unicast PDSCH transmission or a broadcast PDSCH transmission.

Example 7 includes the apparatus of any of Examples 1 to 6, wherein the PDSCH is spatially QCLed with a control resource set (CORESET) identifier (ID) in a slot of a target BWP or a target CC with a data transmission in the PDSCH, when the scheduling offset is less than a defined threshold.

Example 8 includes the apparatus of any of Examples 1 to 7, wherein the UE expects the TCI to be present in the scheduling PDCCH with a scheduling delay that is longer than or equal to a defined threshold.

Example 9 includes an apparatus of a New Radio (NR) base station operable to encode beam indication related information for transmission in a physical downlink shared channel (PDSCH) to a user equipment (UE), the apparatus comprising: one or more processors configured to: encode, at the NR base station, a transmission configuration indication (TCI) in a downlink control information (DCI) for transmission to the UE on a scheduling physical downlink control channel (PDCCH) in a scheduled bandwidth part (BWP) or a scheduled component carrier (CC), wherein cross-carrier scheduling for the scheduled BPW or the scheduled CC is used for the UE in a NR network; encode, at the NR base station, a scheduling offset for transmission to the UE, wherein the scheduling offset is an offset time for transmission of beam indication related information in a physical downlink shared channel (PDSCH); and encode, at the NR base station, the beam indication related information in the PDSCH for transmission to the UE on the scheduled BWP or the scheduled CC at a time period greater than or equal to the scheduling offset relative to the PDCCH transmission, wherein the TCI enables the UE to determine a quasi-co location (QCL) for reception of the beam indication related information in the PDSCH when the time period is greater than or equal to the scheduling offset relative for the PDCCH transmission, and a memory interface configured to retrieve from a memory the TCI, the scheduling offset and the beam indication related information.

Example 10 includes the apparatus Examples 9, further comprising a transceiver configured to: transmit the TCI to the UE; transmit the scheduling offset to the UE; and transmit the beam indication related information to the UE.

Example 11 includes the apparatus of any of Examples 9 to 10, wherein the PDSCH is spatially QCLed with a corresponding downlink reference signal in the TCI when the TCI is included in the scheduling PDCCH and the scheduling offset is greater than or equal to a defined threshold.

Example 12 includes the apparatus of any of Examples 9 to 11, wherein N TCI states are configured for the scheduled BWP or the scheduled CC, wherein N is a positive integer, and the TCI is selected from the N TCI states for the scheduled BWP or the scheduled CC.

Example 13 includes the apparatus of any of Examples 9 to 12, wherein the TCI is included in the scheduling PDCCH when no control resource set (CORESET) is configured or a monitoring occasion of the CORESET is after a data transmission in the PDSCH in the scheduled BWP or the scheduled CC with the PDSCH transmission, and the TCI is included in the scheduling PDCCH with a scheduling delay that is greater than or equal to a defined threshold.

Example 14 includes the apparatus of any of Examples 9 to 13, wherein the CORESET indicates monitoring CORESETs for the UE, and the CORSET is for one or more of a unicast PDSCH transmission or a broadcast PDSCH transmission.

Example 15 includes the apparatus of any of Examples 9 to 14, wherein the PDSCH is spatially QCLed with a control resource set (CORESET) identifier (ID) in a slot of a target BWP or a target CC with a data transmission in the PDSCH, when the scheduling offset is less than a defined threshold.

Example 16 includes the apparatus of any of Examples 9 to 15, wherein the UE expects the TCI to be present in the scheduling PDCCH with a scheduling delay that is longer than or equal to a defined threshold.

Example 17 includes at least one non-transitory machine readable storage medium having instructions embodied thereon for encoding beam indication related information for transmission in a physical downlink shared channel (PDSCH) from a New Radio (NR) base station to a user equipment (UE), the instructions when executed by one or more processors at the NR base station perform the following: decoding, at the UE, a transmission configuration indication (TCI) received in a downlink control information (DCI) from the NR base station on a scheduling physical downlink control channel (PDCCH) in a scheduled bandwidth part (BWP) or a scheduled component carrier (CC), wherein cross-carrier scheduling for the scheduled BPW or the scheduled CC is used for the UE in a NR network; decoding, at the UE, a scheduling offset received from the NR base station, wherein the scheduling offset is an offset time for reception of beam indication related information in a physical downlink shared channel (PDSCH); decoding, at the UE, the beam indication related information received from the NR base station in the PDSCH on the scheduled BWP or the scheduled CC at a time period greater than or equal to the scheduling offset relative to the PDCCH transmission; and determining, at the UE, a quasi-co location (QCL) for reception of the beam indication related information in the PDSCH based on the TCI, when the time period is greater than or equal to the scheduling offset relative for the PDCCH transmission.

Example 18 includes the at least one non-transitory machine readable storage medium of Example 17, wherein the PDSCH is spatially QCLed with a corresponding downlink reference signal in the TCI when the TCI is included in the scheduling PDCCH.

Example 19 includes the at least one non-transitory machine readable storage medium of any of Examples 17 to 18, wherein N TCI states are configured for the scheduled BWP or the scheduled CC, wherein N is a positive integer, and the TCI is selected from the N TCI states for the scheduled BWP or the scheduled CC.

Example 20 includes the at least one non-transitory machine readable storage medium of any of Examples 17 to 19, wherein the TCI is included in the scheduling PDCCH when no control resource set (CORESET) is configured or a monitoring occasion of the CORESET is after a data transmission in the PDSCH in the scheduled BWP or the scheduled CC with the PDSCH transmission, and the TCI is included in the scheduling PDCCH with a scheduling delay that is greater than or equal to a defined threshold.

Example 21 includes the at least one non-transitory machine readable storage medium of any of Examples 17 to 20, wherein the CORESET indicates monitoring CORESETs for the UE, and the CORSET is for one or more of a unicast PDSCH transmission or a broadcast PDSCH transmission.

Example 22 includes the at least one non-transitory machine readable storage medium of any of Examples 17 to 21, wherein the PDSCH is spatially QCLed with a control resource set (CORESET) identifier (ID) in a slot of a target BWP or a target CC with a data transmission in the PDSCH, when the scheduling offset is less than a defined threshold.

Example 23 includes a New Radio (NR) base station operable to encode beam indication related information for transmission in a physical downlink shared channel (PDSCH) to a user equipment (UE), the NR base station comprising: means for decoding, at the UE, a transmission configuration indication (TCI) received in a downlink control information (DCI) from the NR base station on a scheduling physical downlink control channel (PDCCH) in a scheduled bandwidth part (BWP) or a scheduled component carrier (CC), wherein cross-carrier scheduling for the scheduled BPW or the scheduled CC is used for the UE in a NR network; means for decoding, at the UE, a scheduling offset received from the NR base station, wherein the scheduling offset is an offset time for reception of beam indication related information in a physical downlink shared channel (PDSCH); means for decoding, at the UE, the beam indication related information received from the NR base station in the PDSCH on the scheduled BWP or the scheduled CC at a time period greater than or equal to the scheduling offset relative to the PDCCH transmission; and means for determining, at the UE, a quasi-co location (QCL) for reception of the beam indication related information in the PDSCH based on the TCI, when the time period is greater than or equal to the scheduling offset relative for the PDCCH transmission.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to decode downlink control information (DCI) that includes a transmission configuration indication (TCI) received from a base station, the apparatus comprising:
   one or more processors configured to:
      decode, at the UE, the TCI received in the DCI from the base station on a scheduling physical downlink control channel (PDCCH) on a scheduled component carrier (CC) or a scheduled bandwidth part (BWP), wherein cross-carrier scheduling for the scheduled BPW or the scheduled CC is used for the UE;
      decode, at the UE, a scheduling offset received from the base station, wherein the scheduling offset is an offset time for reception of a scheduled physical downlink shared channel (PDSCH);
      determine, at the UE, a quasi-co location (QCL) for reception of the scheduled PDSCH based on the TCI received in the DCI; and
      decode, at the UE, the scheduled PDSCH received from the base station on the scheduled CC or the scheduled BWP at a time period greater than or equal to the scheduling offset relative to the scheduling PDCCH based on the determined QCL; and
   a memory interface configured to send to a memory the TCI and the scheduling offset.

2. The apparatus of claim 1, further comprising a transceiver configured to:
receive the TCI from the base station;
receive the scheduling offset from the base station; and
receive the scheduled PDSCH from the base station.

3. The apparatus of claim 1, wherein N TCI states are configured for the scheduled CC or the scheduled BWP, wherein N is a positive integer, and the TCI is selected from the N TCI states for the scheduled BWP or the scheduled CC.

4. The apparatus of claim 1, wherein the scheduled PDSCH is spatially QCLed with a corresponding downlink reference signal in the TCI when the TCI is included in the scheduling PDCCH and the scheduling offset is greater than or equal to a defined threshold.

5. The apparatus of claim 1, wherein the one or more processors are configured to monitor one or more control resource sets (CORESETs) within the scheduled BWP.

6. An apparatus of a base station operable to encode beam indication related information for transmission in a physical downlink shared channel (PDSCH) to a user equipment (UE), the apparatus comprising:
one or more processors configured to:
encode, at the base station, a transmission configuration indication (TCI) in a downlink control information (DCI) for transmission to the UE on a scheduling physical downlink control channel (PDCCH) in a scheduled bandwidth part (BWP) or a scheduled component carrier (CC), wherein cross-carrier scheduling for the scheduled BPW or the scheduled CC is used for the UE;
encode, at the base station, a scheduling offset for transmission to the UE, wherein the scheduling offset is an offset time for transmission of beam indication related information in a physical downlink shared channel (PDSCH); and
encode, at the base station, the beam indication related information in the PDSCH for transmission to the UE on the scheduled BWP or the scheduled CC at a time period greater than or equal to the scheduling offset relative to the PDCCH transmission based on a quasi co-location (QCL);
wherein the TCI enables the UE to determine the QCL for reception of the beam indication related information in the PDSCH when the time period is greater than or equal to the scheduling offset relative for the PDCCH transmission, and
a memory interface configured to retrieve from a memory the TCI, the scheduling offset and the beam indication related information.

7. The apparatus of claim 6, further comprising a transceiver configured to:
transmit the TCI to the UE;
transmit the scheduling offset to the UE; and
transmit the beam indication related information to the UE.

8. The apparatus of claim 6, wherein the PDSCH is spatially QCLed with a corresponding downlink reference signal in the TCI when the TCI is included in the scheduling PDCCH and the scheduling offset is greater than or equal to a defined threshold.

9. The apparatus of claim 6, wherein N TCI states are configured for the scheduled BWP or the scheduled CC, wherein N is a positive integer, and the TCI is selected from the N TCI states for the scheduled BWP or the scheduled CC.

10. The apparatus of claim 6, wherein the TCI is included in the scheduling PDCCH when no control resource set (CORESET) is configured or a monitoring occasion of the CORESET is after a data transmission in the PDSCH in the scheduled BWP or the scheduled CC with the PDSCH transmission.

11. The apparatus of claim 6, wherein the TCI is included in the scheduling PDCCH with a scheduling delay that is greater than or equal to a defined threshold, and a control resource set (CORESET) indicates monitoring CORESETs for the UE, and the CORSET is for one or more of a unicast PDSCH transmission or a broadcast PDSCH transmission.

12. The apparatus of claim 6, wherein the PDSCH is spatially QCLed with a control resource set (CORESET) identifier (ID) in a slot of a target BWP or a target CC with a data transmission in the PDSCH, when the scheduling offset is less than a defined threshold.

13. The apparatus of claim 6, wherein the TCI is present in the scheduling PDCCH with a scheduling delay that is longer than or equal to a defined threshold.

14. At least one non-transitory machine readable storage medium having instructions embodied thereon for decoding beam indication related information in a physical downlink shared channel (PDSCH) transmitted from a base station to a user equipment (UE), the instructions when executed by one or more processors at the UE perform the following:
decoding, at the UE, a transmission configuration indication (TCI) received in a downlink control information (DCI) from the base station on a scheduling physical downlink control channel (PDCCH) in a scheduled bandwidth part (BWP) or a scheduled component carrier (CC), wherein cross-carrier scheduling for the scheduled BPW or the scheduled CC is used for the UE;
decoding, at the UE, a scheduling offset received from the base station, wherein the scheduling offset is an offset time for reception of beam indication related information in a physical downlink shared channel (PDSCH);
determining, at the UE, a quasi-co location (QCL) for reception of the beam indication related information in the PDSCH based on the TCI, when a time period for decoding the beam indication related information is greater than or equal to the scheduling offset relative to the PDCCH transmission; and
decoding, at the UE, the beam indication related information received from the base station in the PDSCH on the scheduled BWP or the scheduled CC at the time period that is greater than or equal to the scheduling offset relative to the PDCCH transmission based on the determined QCL.

15. The at least one non-transitory machine readable storage medium of claim 14, wherein the PDSCH is spatially QCLed with a corresponding downlink reference signal in the TCI when the TCI is included in the scheduling PDCCH and the scheduling offset is greater than or equal to a defined threshold.

16. The at least one non-transitory machine readable storage medium of claim 14, wherein N TCI states are configured for the scheduled BWP or the scheduled CC, wherein N is a positive integer, and the TCI is selected from the N TCI states for the scheduled BWP or the scheduled CC.

17. The at least one non-transitory machine readable storage medium of claim 14, wherein the TCI is included in the scheduling PDCCH when no control resource set (CORESET) is configured or a monitoring occasion of the CORESET is after a data transmission in the PDSCH in the scheduled BWP or the scheduled CC with the PDSCH transmission.

18. The at least one non-transitory machine readable storage medium of claim 14, wherein the TCI is included in the scheduling PDCCH with a scheduling delay that is greater than or equal to a defined threshold, and a control resource set (CORESET) indicates monitoring CORESETs for the UE and the CORSET is for one or more of a unicast PDSCH transmission or a broadcast PDSCH transmission.

19. The at least one non-transitory machine readable storage medium of claim 14, wherein the PDSCH is spatially QCLed with a control resource set (CORESET) identifier (ID) in a slot of a target BWP or a target CC with a data transmission in the PDSCH, when the scheduling offset is less than a defined threshold.

20. The at least one non-transitory machine readable storage medium of claim 14, further comprising instructions when executed perform the following: determine that the TCI is to be present in the scheduling PDCCH with a scheduling delay that is longer than or equal to a defined threshold.

* * * * *